(12) United States Patent
Heath et al.

(10) Patent No.: US 12,377,481 B2
(45) Date of Patent: *Aug. 5, 2025

(54) SAW BLADE INCLUDING A CUTTING TOOTH WITH A PROTRUSION

(71) Applicant: MILWAUKEE ELECTRIC TOOL CORPORATION, Brookfield, WI (US)

(72) Inventors: Peter R. Heath, Wauwatosa, WI (US); Bryan C. Ward, Wauwatosa, WI (US); Christopher J. Rechlin, Menomonee Falls, WI (US); Austin J. Kazda, Wauwatosa, WI (US); Matthew B. Lois, Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,280

(22) Filed: Jul. 6, 2022

(65) Prior Publication Data

US 2022/0331890 A1 Oct. 20, 2022

Related U.S. Application Data

(63) Continuation of application No. 16/611,433, filed as application No. PCT/US2018/032861 on May 16, 2018, now Pat. No. 11,413,693.

(Continued)

(51) Int. Cl.
*B23D 61/12* (2006.01)
*B23D 49/16* (2006.01)
(Continued)

(52) U.S. Cl.
CPC ......... *B23D 61/121* (2013.01); *B23D 61/123* (2013.01); *B23D 49/162* (2013.01); *B23D 51/10* (2013.01); *B27B 33/02* (2013.01)

(58) Field of Classification Search
CPC ... B26D 61/21; B26D 61/123; Y10T 83/9319; B23D 49/162; B23D 5/10; B27B 33/02
(Continued)

(56) References Cited

U.S. PATENT DOCUMENTS

| 81,413 A | 8/1868 | Sattler |
| 82,289 A | 9/1868 | Burgess |

(Continued)

FOREIGN PATENT DOCUMENTS

| CN | 1207974 A | 2/1999 |
| CN | 1106900 C | 4/2003 |

(Continued)

OTHER PUBLICATIONS

Extended European Search Report for Application No. 22181630.9 dated Nov. 15, 2022 (6 pages).

(Continued)

*Primary Examiner* — Adam J Eiseman
*Assistant Examiner* — Fernando A Ayala
(74) *Attorney, Agent, or Firm* — Michael Best & Friedrich LLP

(57) ABSTRACT

A saw blade includes a cutting portion having consecutive first, second, and third cutting teeth. Each cutting tooth includes a rake surface, a relief surface, and a tip. The first cutting tooth includes a protrusion extending from the relief surface of the first cutting tooth. The cutting portion includes a first gullet positioned between the first cutting tooth and the second cutting tooth and a second gullet sized differently than the first gullet positioned between the second cutting tooth and the third cutting tooth. The cutting portion includes a first pitch extending over the first gullet from the tip of the first cutting tooth to the tip of the second cutting tooth. The cutting portion includes a second pitch different than the first pitch extending over the second gullet from the (Continued)

tip of the second cutting tooth to the tip of the third cutting tooth.

20 Claims, 5 Drawing Sheets

Related U.S. Application Data

(60) Provisional application No. 62/506,716, filed on May 16, 2017.

(51) Int. Cl.
  *B23D 51/10* (2006.01)
  *B27B 33/02* (2006.01)

(58) Field of Classification Search
  USPC .......................................................... D8/20
  See application file for complete search history.

(56) References Cited

U.S. PATENT DOCUMENTS

| | | | |
|---|---|---|---|
| 124,825 A | 3/1872 | Jincks | |
| 293,576 A | 2/1884 | Haselton | |
| 349,143 A | 9/1886 | Clemson | |
| 394,222 A | 12/1888 | Stephens | |
| 398,302 A * | 2/1889 | Wilson | B23D 61/121 83/850 |
| 434,352 A | 8/1890 | Miller | |
| 566,865 A * | 9/1896 | Morrish | B23D 61/121 83/846 |
| 576,724 A | 2/1897 | Foster | |
| 603,128 A | 4/1898 | Clemson | |
| 820,969 A | 5/1906 | Grelck | |
| 1,181,529 A | 5/1916 | Hutton | |
| 1,381,478 A | 6/1921 | Lawrence | |
| 1,381,930 A | 6/1921 | Morgan | |
| 1,390,400 A | 9/1921 | Threet | |
| 1,558,040 A | 10/1925 | Petersen | |
| 1,876,945 A | 9/1932 | Hutchings | |
| 2,126,382 A | 8/1938 | Goff et al. | |
| 2,227,864 A | 1/1941 | Ronan | |
| 2,241,703 A | 5/1941 | Gommel | |
| 2,242,137 A | 5/1941 | Miller | |
| 2,328,869 A | 9/1943 | Wilkie | |
| 2,355,124 A | 8/1944 | Henry | |
| 2,394,035 A | 2/1946 | Blum | |
| 2,429,008 A | 10/1947 | Wolfe | |
| 2,534,424 A | 12/1950 | Dryden | |
| 2,568,870 A | 9/1951 | Ronan | |
| 2,573,573 A | 10/1951 | Jenkins | |
| 2,635,327 A | 4/1953 | Enlow | |
| 2,637,355 A | 5/1953 | Chapin | |
| 2,646,094 A | 7/1953 | Russell | |
| 2,682,098 A | 6/1954 | Wilcox | |
| 2,780,256 A | 2/1957 | Dodd | |
| 2,795,045 A | 6/1957 | Taylor | |
| 2,799,930 A | 7/1957 | Champlin | |
| 2,802,511 A | 8/1957 | Waugh | |
| 2,876,809 A | 3/1959 | Walter et al. | |
| 2,916,066 A | 12/1959 | Morse | |
| 2,978,001 A | 4/1961 | Whisler | |
| 2,987,086 A | 6/1961 | Westlund, Jr. | |
| 3,028,889 A | 4/1962 | McCarty | |
| 3,033,251 A | 5/1962 | Atkinson et al. | |
| 3,061,927 A | 11/1962 | Ludwigsdorf | |
| 3,111,859 A | 11/1963 | Joseph | |
| 3,111,970 A | 11/1963 | Priest et al. | |
| 3,171,457 A | 3/1965 | Brown | |
| 3,176,732 A | 4/1965 | Henderson | |
| 3,292,674 A | 12/1966 | Turner | |
| 3,309,756 A | 3/1967 | Segal | |
| 3,314,456 A | 4/1967 | Craven | |
| 3,357,462 A | 12/1967 | Craven | |
| 3,416,579 A | 12/1968 | Cowley | |
| 3,450,209 A | 6/1969 | Lowery | |
| 3,477,479 A | 11/1969 | Doty | |
| 3,576,061 A | 4/1971 | Pahlitzsch | |
| 3,576,200 A | 4/1971 | Elmes | |
| 3,651,841 A | 3/1972 | Ohlsson | |
| 3,680,610 A | 8/1972 | Lindgren | |
| 3,964,163 A | 6/1976 | Russo et al. | |
| 4,027,390 A | 6/1977 | Kendzior et al. | |
| 4,119,004 A | 10/1978 | Ludwig | |
| 4,137,808 A | 2/1979 | Mattes | |
| 4,179,967 A | 12/1979 | Clark | |
| 4,232,578 A | 11/1980 | Stellinger et al. | |
| 4,236,432 A | 12/1980 | Kawakami et al. | |
| D257,943 S | 1/1981 | Finlay | |
| 4,253,344 A | 3/1981 | Kerklies | |
| 4,264,314 A | 4/1981 | Imamura | |
| 4,272,788 A | 6/1981 | Ogita | |
| 4,292,871 A | 10/1981 | Neumeyer et al. | |
| 4,311,075 A | 1/1982 | Sundstrom | |
| 4,339,977 A | 7/1982 | Miller | |
| 4,345,499 A | 8/1982 | Ross | |
| RE31,433 E | 11/1983 | Clark | |
| 4,423,553 A | 1/1984 | Miyawaki | |
| 4,423,653 A | 1/1984 | Howard | |
| 4,432,264 A | 2/1984 | Scott | |
| 4,461,198 A | 7/1984 | Grassmann | |
| 4,492,141 A | 1/1985 | Takeuchi | |
| 4,515,055 A | 5/1985 | Scott | |
| 4,557,172 A | 12/1985 | Yoneda | |
| 4,587,876 A | 5/1986 | Erhardt | |
| 4,640,172 A | 2/1987 | Kullmann et al. | |
| 4,647,278 A | 3/1987 | Hull | |
| 4,688,458 A | 8/1987 | Krilov | |
| 4,727,788 A | 3/1988 | Yoshida et al. | |
| 4,784,033 A | 11/1988 | Hayden et al. | |
| 4,784,034 A | 11/1988 | Stones et al. | |
| 4,798,001 A | 1/1989 | Grossman et al. | |
| 4,802,396 A | 2/1989 | Kuklinski | |
| 4,813,324 A | 3/1989 | Yoshida et al. | |
| 4,827,822 A | 5/1989 | Yoshida et al. | |
| 4,832,670 A | 5/1989 | Miranti, Jr. | |
| 2,890,728 A | 6/1989 | Craven | |
| 4,867,026 A | 9/1989 | Henning et al. | |
| 4,878,411 A | 11/1989 | Laskowski et al. | |
| 4,884,998 A | 12/1989 | Miranti, Jr. | |
| D306,817 S | 3/1990 | McMorrough | |
| 4,913,022 A | 4/1990 | Kuklinski | |
| 4,938,736 A | 7/1990 | Miranti, Jr. | |
| 4,958,546 A | 9/1990 | Yoshida et al. | |
| 4,976,662 A | 12/1990 | Miranti, Jr. | |
| 4,989,489 A | 2/1991 | Pinney | |
| 5,001,957 A | 3/1991 | Steckler | |
| 5,018,421 A | 5/1991 | Lucki et al. | |
| D320,543 S | 10/1991 | Gilbert | |
| 5,055,090 A | 10/1991 | Miranti, Jr. | |
| 5,062,338 A | 11/1991 | Baker | |
| 5,076,741 A | 12/1991 | Littlehorn | |
| 5,085,113 A | 2/1992 | Pinney | |
| 5,094,135 A | 3/1992 | Nakahara et al. | |
| 5,095,623 A | 3/1992 | Williams | |
| 5,119,708 A | 6/1992 | Musgrove | |
| 5,172,619 A | 12/1992 | Kolve | |
| 5,211,212 A | 5/1993 | Carlson et al. | |
| 5,231,909 A | 8/1993 | Hsu | |
| 5,249,485 A | 10/1993 | Hayden, Sr. | |
| 5,295,426 A | 3/1994 | Planchon | |
| 5,306,285 A | 4/1994 | Miller et al. | |
| 5,331,876 A | 7/1994 | Hayden, Sr. | |
| D352,218 S | 11/1994 | Nygards | |
| 5,361,665 A * | 11/1994 | Sonefors | B23D 61/121 83/848 |
| 5,410,935 A | 5/1995 | Holston et al. | |
| 5,417,777 A | 5/1995 | Henderer | |
| 5,423,845 A | 6/1995 | McDaniel | |
| 5,425,296 A | 6/1995 | Kullmann et al. | |
| 5,433,457 A | 7/1995 | Wright | |
| 5,443,276 A | 8/1995 | Nasser et al. | |
| 5,473,820 A | 12/1995 | Neubert et al. | |

(56) References Cited

U.S. PATENT DOCUMENTS

| | | |
|---|---|---|
| 5,477,763 A | 12/1995 | Kullman |
| 5,501,129 A | 3/1996 | Armstrong et al. |
| 5,503,202 A | 4/1996 | Butler |
| 5,517,889 A | 5/1996 | Logan |
| 5,555,788 A | 9/1996 | Gakhar et al. |
| 5,564,324 A | 10/1996 | Bird |
| 5,581,848 A | 12/1996 | Egerer |
| 5,603,252 A | 2/1997 | Hayden, Sr. |
| 5,606,900 A | 3/1997 | Stoddard |
| 5,697,280 A | 12/1997 | Armstrong et al. |
| 5,758,561 A | 6/1998 | Curtsinger et al. |
| 5,803,677 A | 9/1998 | Brutscher et al. |
| 5,803,678 A | 9/1998 | Korb et al. |
| 5,813,308 A | 9/1998 | Wildey et al. |
| 5,823,803 A | 10/1998 | Majors |
| 5,832,803 A | 11/1998 | Hayden, Sr. |
| 5,848,473 A | 12/1998 | Brandenburg, Jr. |
| 5,855,157 A | 1/1999 | Okamura et al. |
| 5,855,158 A | 1/1999 | Donofrio |
| 5,868,058 A | 2/1999 | Senegas |
| 5,884,547 A | 3/1999 | Carlsen et al. |
| 5,896,800 A | 4/1999 | Curtsinger et al. |
| 5,901,630 A | 5/1999 | Kataoka et al. |
| 5,918,525 A | 7/1999 | Schramm |
| 5,946,985 A | 9/1999 | Carlsen et al. |
| 5,964,039 A | 10/1999 | Mizoguchi et al. |
| 6,003,422 A | 12/1999 | Holston |
| 6,065,370 A | 5/2000 | Curtsinger et al. |
| 6,065,380 A | 5/2000 | Lundh |
| 6,082,239 A | 7/2000 | Blaedel et al. |
| 6,119,571 A | 9/2000 | Hayden, Sr. |
| 6,120,221 A | 9/2000 | Alm |
| 6,125,544 A | 10/2000 | Eriksson et al. |
| 6,145,426 A | 11/2000 | Ward et al. |
| 6,152,661 A | 11/2000 | Thrasher |
| 6,158,324 A | 12/2000 | Kullmann et al. |
| 6,167,792 B1 | 1/2001 | Korb et al. |
| 6,178,646 B1 | 1/2001 | Schnell et al. |
| D438,549 S | 3/2001 | Tsujimoto |
| 6,205,902 B1 | 3/2001 | Vuorinen |
| 6,206,616 B1 | 3/2001 | Smith et al. |
| 6,220,139 B1 | 4/2001 | Kobayashi et al. |
| 6,220,140 B1 | 4/2001 | Hellebergh |
| 6,230,411 B1 | 5/2001 | Wall et al. |
| 6,244,152 B1 | 6/2001 | Di Nicolantonio |
| 6,257,226 B1 | 7/2001 | Hayden, Sr. |
| 6,269,722 B1 | 8/2001 | Hellbergh |
| 6,276,248 B1 | 8/2001 | Cranna |
| 6,276,249 B1 | 8/2001 | Handschuh et al. |
| 6,321,618 B1 | 11/2001 | Hayden, Sr. |
| 6,357,122 B2 | 3/2002 | Bachta |
| 6,357,124 B1 | 3/2002 | Wall et al. |
| 6,363,827 B1 | 4/2002 | Osing et al. |
| 6,401,585 B1 | 6/2002 | Morgan |
| 6,412,377 B1 | 7/2002 | Blaedel et al. |
| 6,427,573 B1 | 8/2002 | Carlsen et al. |
| 6,439,094 B1 | 8/2002 | Yoneda et al. |
| D465,138 S | 11/2002 | Raines |
| 6,497,046 B1 | 12/2002 | Bardeen et al. |
| 6,520,722 B2 | 2/2003 | Hopper et al. |
| 6,532,852 B1 | 3/2003 | Tsujimoto et al. |
| 6,543,326 B2 | 4/2003 | Bishop |
| 6,588,992 B2 | 7/2003 | Rudolph |
| 6,598,509 B2 | 7/2003 | Cook et al. |
| 6,599,063 B1 | 7/2003 | Capstran |
| 6,601,495 B2 | 8/2003 | Cranna |
| 6,625,891 B2 | 9/2003 | Stielper |
| D482,945 S | 12/2003 | Grolimund |
| 6,681,674 B2 | 1/2004 | Hakansson et al. |
| 6,715,211 B1 | 4/2004 | Chi |
| 6,782,781 B2 | 8/2004 | Rack |
| 6,810,783 B1 | 11/2004 | Larose |
| 6,834,573 B1 | 12/2004 | Nakahara |
| 6,931,975 B2 | 8/2005 | Haughton et al. |
| 6,939,092 B2 | 9/2005 | Korb et al. |
| 6,945,850 B2 | 9/2005 | Perrey |
| 6,994,307 B2 | 2/2006 | Curtsinger et al. |
| 7,013,748 B2 | 3/2006 | Satoh et al. |
| 7,013,784 B2 | 3/2006 | Lowder et al. |
| 7,017,465 B2 | 3/2006 | Dion et al. |
| D521,346 S | 5/2006 | Budrow et al. |
| 7,036,415 B2 | 5/2006 | Tsujimoto |
| 7,036,417 B2 | 5/2006 | Alton |
| D526,177 S | 8/2006 | Lui |
| D527,233 S | 8/2006 | Burke, III |
| 7,117,863 B1 | 10/2006 | Dassoulas |
| 7,121,180 B2 | 10/2006 | Shimofurutani |
| 7,127,979 B2 | 10/2006 | Kocher et al. |
| 7,131,365 B2 | 11/2006 | Hall et al. |
| 7,140,287 B2 | 11/2006 | Lowder et al. |
| 7,150,215 B2 | 12/2006 | Krehel |
| D534,401 S | 1/2007 | Duffin et al. |
| 7,174,823 B2 | 2/2007 | Cranna |
| 7,178,441 B2 | 2/2007 | Hellbergh |
| 7,210,388 B2 | 5/2007 | Pacher et al. |
| 7,225,714 B2 | 6/2007 | Rompel et al. |
| 7,225,715 B2 * | 6/2007 | Lowder ............... B23D 61/021 83/676 |
| 7,257,900 B2 | 8/2007 | Wheeler et al. |
| D551,923 S | 10/2007 | Ammann |
| D554,452 S | 11/2007 | Ammann |
| D555,444 S | 11/2007 | Ammann |
| 7,334,511 B2 | 2/2008 | Hesselberg et al. |
| D578,847 S | 10/2008 | Mashburn |
| 7,487,872 B2 | 2/2009 | Curtsinger et al. |
| D591,574 S | 5/2009 | DiPasquale et al. |
| 7,527,628 B2 | 5/2009 | Fletcher et al. |
| 7,568,416 B2 | 8/2009 | Tsujimoto |
| 7,597,036 B1 | 10/2009 | Loper |
| 7,600,458 B2 | 10/2009 | Hampton et al. |
| D606,820 S | 12/2009 | Burke, III |
| D608,611 S | 1/2010 | Lowder |
| 7,661,347 B2 | 2/2010 | Nagano et al. |
| D623,490 S | 9/2010 | Lauber |
| 7,806,033 B2 | 10/2010 | Kocher et al. |
| D642,028 S | 7/2011 | Fosberg et al. |
| 8,113,100 B1 | 2/2012 | Cranna et al. |
| D686,049 S | 7/2013 | Ji |
| D693,661 S | 11/2013 | Fosberg, Jr. et al. |
| 8,596,166 B2 | 12/2013 | Bucks et al. |
| 8,689,667 B2 | 4/2014 | Butzen et al. |
| 8,776,659 B2 | 7/2014 | Butzen et al. |
| D714,602 S | 10/2014 | Fosberg, Jr. et al. |
| D725,450 S | 3/2015 | Hampton et al. |
| 9,079,259 B2 | 7/2015 | Grolimund |
| 9,248,518 B2 | 2/2016 | Elliston et al. |
| 10,112,244 B2 | 10/2018 | Butzen et al. |
| 10,363,619 B2 | 7/2019 | George et al. |
| D875,488 S | 2/2020 | Bloom et al. |
| D909,159 S | 2/2021 | Heath et al. |
| D911,796 S | 3/2021 | Chollet et al. |
| D936,437 S | 11/2021 | Kazda et al. |
| 11,413,693 B2 | 8/2022 | Heath et al. |
| D968,918 S | 11/2022 | Moore |
| D977,926 S | 2/2023 | Butzen et al. |
| 2001/0004860 A1 | 6/2001 | Kullmann et al. |
| 2001/0006017 A1 | 7/2001 | Osada et al. |
| 2001/0015120 A1 | 8/2001 | Hickey |
| 2002/0029679 A1 | 3/2002 | Cranna |
| 2002/0050196 A1 | 5/2002 | Fluhrer et al. |
| 2002/0078813 A1 | 6/2002 | Hoffman |
| 2002/0184981 A1 | 12/2002 | Tsujimoto |
| 2002/0184988 A1 | 12/2002 | Rohman et al. |
| 2003/0010179 A1 | 1/2003 | McLuen |
| 2003/0019636 A1 | 1/2003 | Robichaux |
| 2003/0051593 A1 | 3/2003 | Kocher et al. |
| 2003/0196536 A1 | 10/2003 | Herrmann |
| 2003/0221534 A1 | 12/2003 | Lowder et al. |
| 2004/0016125 A1 | 1/2004 | Tanehiko et al. |
| 2004/0035282 A1 | 2/2004 | Tsujimoto |
| 2004/0050234 A1 | 3/2004 | Fluhrer |
| 2004/0065183 A1 | 4/2004 | Asada |
| 2004/0163264 A1 | 8/2004 | Simonz |

(56) References Cited

U.S. PATENT DOCUMENTS

| | | | |
|---|---|---|---|
| 2004/0182218 A1* | 9/2004 | Chao | B23D 61/121 83/848 |
| 2004/0255740 A1 | 12/2004 | Troyer | |
| 2004/0255749 A1 | 12/2004 | Hayden, Sr. | |
| 2005/0172416 A1 | 8/2005 | Feliciano | |
| 2005/0188792 A1 | 9/2005 | Asada | |
| 2005/0211023 A1 | 9/2005 | Kalo | |
| 2005/0211046 A1 | 9/2005 | Thomas et al. | |
| 2005/0229407 A1 | 10/2005 | Kanzawa | |
| 2005/0257660 A1 | 11/2005 | Hayden | |
| 2005/0262702 A1 | 12/2005 | Hawthorn | |
| 2006/0016315 A1 | 1/2006 | Zorich et al. | |
| 2006/0065098 A1 | 3/2006 | Cranna | |
| 2006/0130341 A1 | 6/2006 | Burry et al. | |
| 2006/0130628 A1 | 6/2006 | Rompel et al. | |
| 2006/0130629 A1 | 6/2006 | Rompel et al. | |
| 2006/0130631 A1 | 6/2006 | Hesselberg et al. | |
| 2006/0160341 A1 | 7/2006 | Lin et al. | |
| 2006/0162526 A1 | 7/2006 | Nagano et al. | |
| 2006/0162826 A1 | 7/2006 | Beguinot et al. | |
| 2006/0207398 A1 | 9/2006 | Nicolson et al. | |
| 2007/0056427 A1 | 3/2007 | Males | |
| 2007/0101580 A1 | 5/2007 | Fossella | |
| 2007/0180972 A1 | 8/2007 | Lowder et al. | |
| 2007/0180973 A1 | 8/2007 | Lowder et al. | |
| 2007/0199416 A1 | 8/2007 | Cook et al. | |
| 2007/0214922 A1 | 9/2007 | Cook et al. | |
| 2007/0221033 A1 | 9/2007 | Taffertshofer | |
| 2007/0234870 A1* | 10/2007 | Brabfilev | B23D 61/04 83/852 |
| 2007/0251372 A1 | 11/2007 | Petts et al. | |
| 2008/0028903 A1 | 2/2008 | Greenberg | |
| 2008/0121079 A1 | 5/2008 | Hashimoto et al. | |
| 2008/0121084 A1 | 5/2008 | Vogel et al. | |
| 2008/0163735 A1* | 7/2008 | Lundin | B23D 61/121 83/848 |
| 2008/0172890 A1 | 7/2008 | Shetterly | |
| 2008/0201964 A1 | 8/2008 | Camargo et al. | |
| 2008/0264231 A1 | 10/2008 | Coe et al. | |
| 2008/0307936 A1* | 12/2008 | Elliston | B23D 61/121 83/13 |
| 2009/0013847 A1 | 1/2009 | Lauzet | |
| 2009/0049973 A1 | 2/2009 | Huffer et al. | |
| 2009/0126205 A1 | 5/2009 | Kullmann et al. | |
| 2009/0126712 A1 | 5/2009 | Kullmann et al. | |
| 2009/0144992 A1 | 6/2009 | Bucks | |
| 2009/0145280 A1 | 6/2009 | Bucks et al. | |
| 2009/0293698 A1 | 12/2009 | Tran et al. | |
| 2010/0126328 A1 | 5/2010 | Grolimund | |
| 2010/0175532 A1 | 7/2010 | Evatt et al. | |
| 2011/0259165 A1 | 10/2011 | Chiang et al. | |
| 2011/0271815 A1* | 11/2011 | Elliston | B23D 61/121 83/835 |
| 2012/0090443 A1* | 4/2012 | Butzen | B23D 61/123 83/849 |
| 2012/0216656 A1 | 8/2012 | Bucks et al. | |
| 2013/0180375 A1 | 7/2013 | Rearick et al. | |
| 2013/0333541 A1 | 12/2013 | Karlen et al. | |
| 2014/0020531 A1 | 1/2014 | Tsujimoto | |
| 2014/0033889 A1 | 2/2014 | Bucks et al. | |
| 2014/0283667 A1 | 9/2014 | Butzen et al. | |
| 2016/0193674 A1 | 7/2016 | Bucks et al. | |
| 2017/0120356 A1* | 5/2017 | George | B23D 49/16 |
| 2017/0326661 A1 | 11/2017 | Butzen et al. | |
| 2018/0056404 A1* | 3/2018 | Beach | B23D 61/121 |
| 2018/0099342 A1 | 4/2018 | Muti et al. | |
| 2018/0333794 A1* | 11/2018 | Dietz | B23D 61/123 |
| 2019/0054553 A1 | 2/2019 | Hunter | |

FOREIGN PATENT DOCUMENTS

| | | | |
|---|---|---|---|
| CN | 101743103 A | 6/2010 | |
| CN | 103143775 A | 6/2013 | |
| DE | 1503939 A1 | 9/1969 | |
| DE | 8805767 U1 | 6/1988 | |
| DE | 29501708 U1 | 5/1996 | |
| DE | 19501019 A1 | 7/1996 | |
| DE | 10300392 A1 | 7/2004 | |
| DE | 20316149 U1 | 2/2005 | |
| DE | 202004017351 U1 | 3/2006 | |
| DE | 19820430 B4 | 4/2009 | |
| DE | 19820431 B4 | 11/2009 | |
| EP | 609791 A1 | 8/1994 | |
| EP | 786302 A2 | 7/1997 | |
| EP | 1078706 A2 | 2/2001 | |
| EP | 2070624 A1 | 6/2009 | |
| EP | 3162484 A1 | 5/2017 | |
| GB | 220756 A | 8/1924 | |
| GB | 251184 A | 4/1926 | |
| GB | 2009670 A | 6/1979 | |
| GB | 2182606 A | 5/1987 | |
| JP | 9118311 A | 5/1997 | |
| JP | 9118356 A | 5/1997 | |
| JP | 10328930 A | 12/1998 | |
| JP | 11019822 A | 1/1999 | |
| JP | H1119821 A | 1/1999 | |
| JP | 2000135625 A | 5/2000 | |
| JP | 2000271817 A | 10/2000 | |
| JP | 2000343325 A | 12/2000 | |
| JP | 2001009634 A | 1/2001 | |
| JP | 2001112325 A * | 4/2001 | B27B 33/06 |
| JP | 2001128530 A * | 5/2001 | |
| JP | 2001259927 A | 9/2001 | |
| JP | 2003048121 A | 2/2003 | |
| JP | 2003334721 A | 11/2003 | |
| JP | 2003340642 A | 12/2003 | |
| JP | 2003340643 A | 12/2003 | |
| JP | 2003340644 A | 12/2003 | |
| JP | 2005169546 A | 6/2005 | |
| JP | 2007290112 A | 11/2007 | |
| KR | 100625218 B1 * | 1/2006 | B23B 51/04 |
| WO | WO0206020 A1 | 1/2002 | |
| WO | WO0240233 A2 | 5/2002 | |
| WO | WO2005096949 A2 | 10/2005 | |
| WO | WO2011140533 A1 | 11/2011 | |

OTHER PUBLICATIONS

Bosch, Heavy Use Reciprocating Saw Blades, Available Dec. 23, 2009, Retrieved from the Internet <URL: http://www.boschtools.com/Products/Accessories/Pages/BoschProductCategory-.aspx?catid=128>.

Bosch, Progessor for All-Purpose, Available Dec. 23, 2009, Retrieved from the Internet <URL: http://www.boschtools.com/Products/Accessories/Pages/BoschAccessoryDetail-.aspx?pid=285#specs>.

Bosch, Progessor for Wood, Available Dec. 23, 2009, Retrieved from the Internet <URL: http://www.boschtools.com/Products/Accessories/Pages/BoschAccessoryDetail-.aspx?pid=287#specs>.

Bosch, Heavy for Wood with Nails, Available Dec. 23, 2009, Retrieved from the Internet <URL: http://www.boschtools.com/Products/Accessories/Pages/BoschAccessoryDetail-.aspx?pid=284#specs>.

Bosch, Tools Catalog: Saws and Benchtop Tools and Accessories, 2010 (52 pages).

Extended European Search Report for Application No. 18801477.3 dated Jan. 22, 2021 (11 pages).

Chinese Patent Office Action for Application No. 201880032542.3 dated Jan. 6, 2021 (12 pages including statement of relevance).

International Search Report and Written Opinion for Application No. PCT/US2018/032861 dated Sep. 13, 2018 (15 pages).

Bosch, "Reciprocating Saw Blades," Bosch Power Tools and Accessories 2002/2003 Catalog, © 2002, p. 151 (3 pages including front and back cover).

Amazon, "Milwaukee Electric Tool 49-22-1129 Sawzall Reciprocating Saw Blade Set, 12 Pc, White," <https://www.amazon.com/Milwaukee-Electric-49-22-1129-Sawzall-Reciprocating/dp/B000BYAZLE/ref=sr_1_1?crid=110TU1RPWDEX&keywords=ASIN+B000BYAZLE&qid=1652973269&sprefix=asin+b000byazle%2Caps%2C77&sr=8-1> ASIN: B000BYAZLE, web page visited May 19, 2022.

(56) References Cited

OTHER PUBLICATIONS

Amazon, "Milwaukee 48-00-5026 The Ax 9-Inch 5 TPI Reciprocating Saw Blades, 5-Pack," <https://www.amazon.com/Milwaukee-48-00-5026-9-Inch-Reciprocating-Blades/dp/B00002248Y/ref=sr_1_1?crid=Y012A2GMQOMK&keywords=ASIN+B00002248Y&qid=1652972649&sprefix=asin+b00002248y%2Caps%2C73&sr=8-1> ASIN: B00002248Y, web page visited May 19, 2022.

Non-Final Office Action issued in U.S. Appl. No. 29/757,541 dated Mar. 7, 2022 (6 pages).

Chinese Patent Office Action for Application No. 201880032542.3 dated May 22, 2025 (21 pages including machine translation).

* cited by examiner

SAW BLADE INCLUDING A CUTTING TOOTH WITH A PROTRUSION

CROSS-REFERENCE TO RELATED APPLICATIONS

This application is a continuation of U.S. patent application Ser. No. 16/611,433, filed on Nov. 6, 2019, now U.S. Pat. No. 11,413,693, which is a national phase filing under 35 U.S.C. 371 of International Application No. PCT/US2018/032861 filed on May 16, 2018, which claims priority to U.S. Provisional Patent Application No. 62/506,716, filed on May 16, 2017, the entire contents of all of which are incorporated herein by reference.

BACKGROUND

The present invention relates to saw blades and, more particularly, to saw blades for use with power tools.

SUMMARY

Saw blades, such as reciprocating saw blades, are used for cutting wood, metal, plastics, and other materials. A saw blade typically includes a body, one or more attachment portions, and a cutting portion. The cutting portion comprises a plurality of teeth made up of one or more tooth forms. Tooth forms on saw blades are a major factor in the durability, cost, speed of cutting, and accuracy and quality of cuts made. Each tooth typically includes a tip, a relief face, a rake face, and a gullet. The teeth are generally separated by a pitch length (otherwise identified as the number of teeth per inch (TPI)). Some tooth forms vary along the length of the saw blade or include portions having varied teeth. In some tooth forms, a nail may become lodged in the gullet of a tooth during operation, thereby breaking or otherwise damaging the tooth.

In one aspect, a saw blade for use with a power tool includes a body defining a longitudinal axis and an attachment portion coupled to the body. The attachment portion includes a tang and an aperture configured to couple to the power tool. The saw blade also includes a cutting portion formed on the body. The cutting portion includes consecutive first, second, and third cutting teeth. The first, second, and third cutting teeth each includes a rake surface, a relief surface, and a tip positioned between the rake and relief surfaces. The first cutting tooth includes a protrusion extending from an end of the relief surface of the first cutting tooth. The second cutting tooth does not include a protrusion on the relief surface of the second cutting tooth. The cutting portion includes a first gullet positioned between the first cutting tooth and the second cutting tooth. The cutting portion includes a second gullet sized differently than the first gullet positioned between the second cutting tooth and the third cutting tooth. The cutting portion includes a first pitch extending over the first gullet from the tip of the first cutting tooth to the tip of the second cutting tooth. The cutting portion includes a second pitch different than the first pitch extending over the second gullet from the tip of the second cutting tooth to the tip of the third cutting tooth.

In another aspect, a saw blade for use with a power tool includes a body and an attachment portion coupled to the body and configured to couple to the power tool. The saw blade also includes a cutting portion formed on the body. The cutting portion includes consecutive first, second, and third cutting teeth. The first, second, and third cutting teeth each includes a rake surface, a relief surface, and a tip positioned between the rake and relief surfaces. The first cutting tooth includes a protrusion extending from an end of the relief surface of the first cutting tooth. The second cutting tooth does not include a protrusion on the relief surface of the second cutting tooth. The cutting portion includes a first gullet positioned between the first cutting tooth and the second cutting tooth. The cutting portion includes a second gullet positioned between the second cutting tooth and the third cutting tooth. The cutting portion includes a first pitch extending over the first gullet from the tip of the first cutting tooth to the tip of the second cutting tooth. The cutting portion includes a second pitch different than the first pitch extending over the second gullet from the tip of the second cutting tooth to the tip of the third cutting tooth.

In yet another aspect, a saw blade for use with a power tool includes a body and an attachment portion coupled to the body and configured to couple to the power tool. The saw blade also includes a cutting portion formed on the body. The cutting portion includes consecutive first, second, and third cutting teeth. The first, second, and third cutting teeth each includes a rake surface, a relief surface, and a tip positioned between the rake and relief surfaces. The first cutting tooth includes a protrusion extending from an end of the relief surface of the first cutting tooth. The second cutting tooth does not include a protrusion on the relief surface of the second cutting tooth. The cutting portion includes a first gullet positioned between the first cutting tooth and the second cutting tooth. The cutting portion includes a second gullet sized differently than the first gullet positioned between the second cutting tooth and the third cutting tooth.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
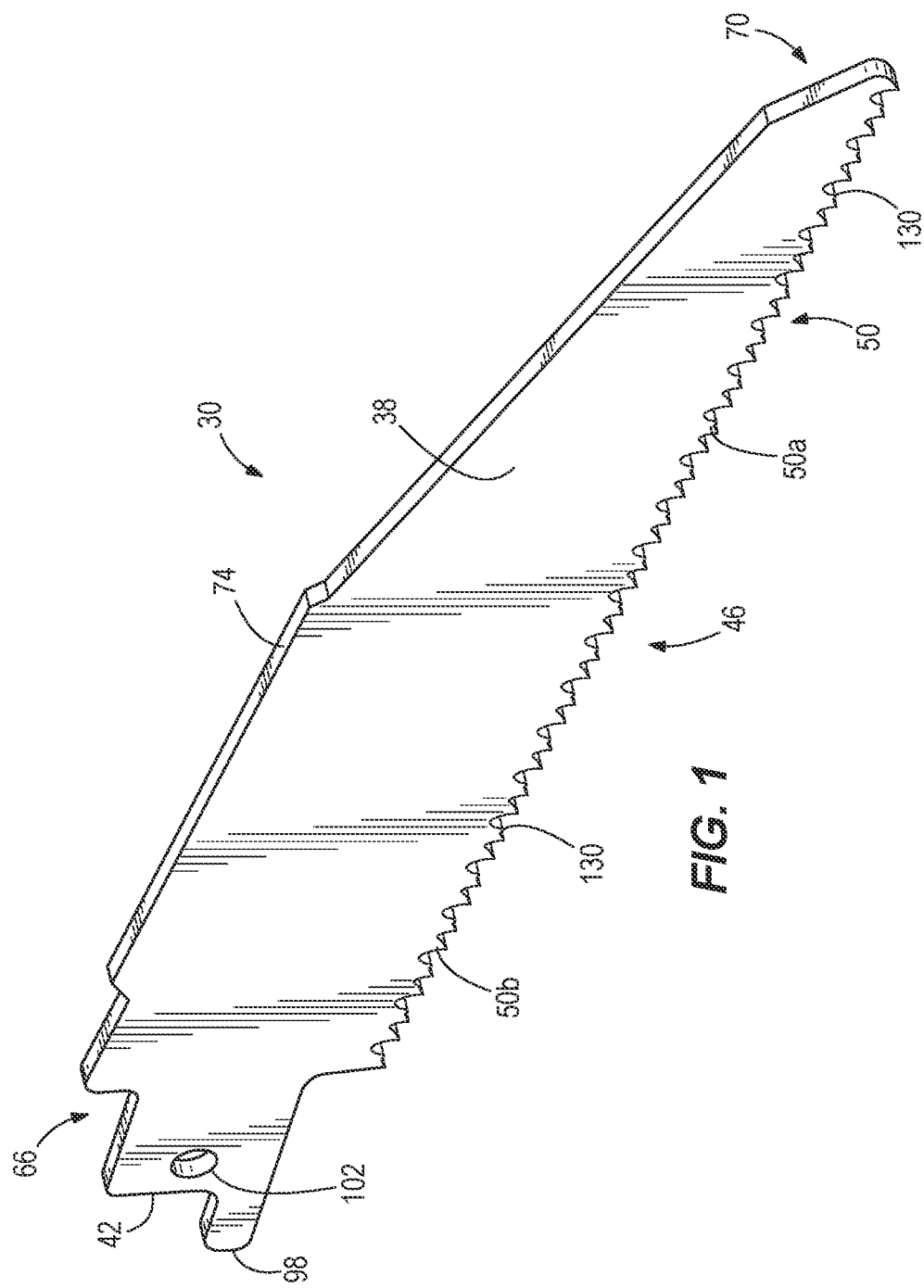
FIG. 1 is a perspective view of a saw blade according to one embodiment of the invention.
Figure 2:
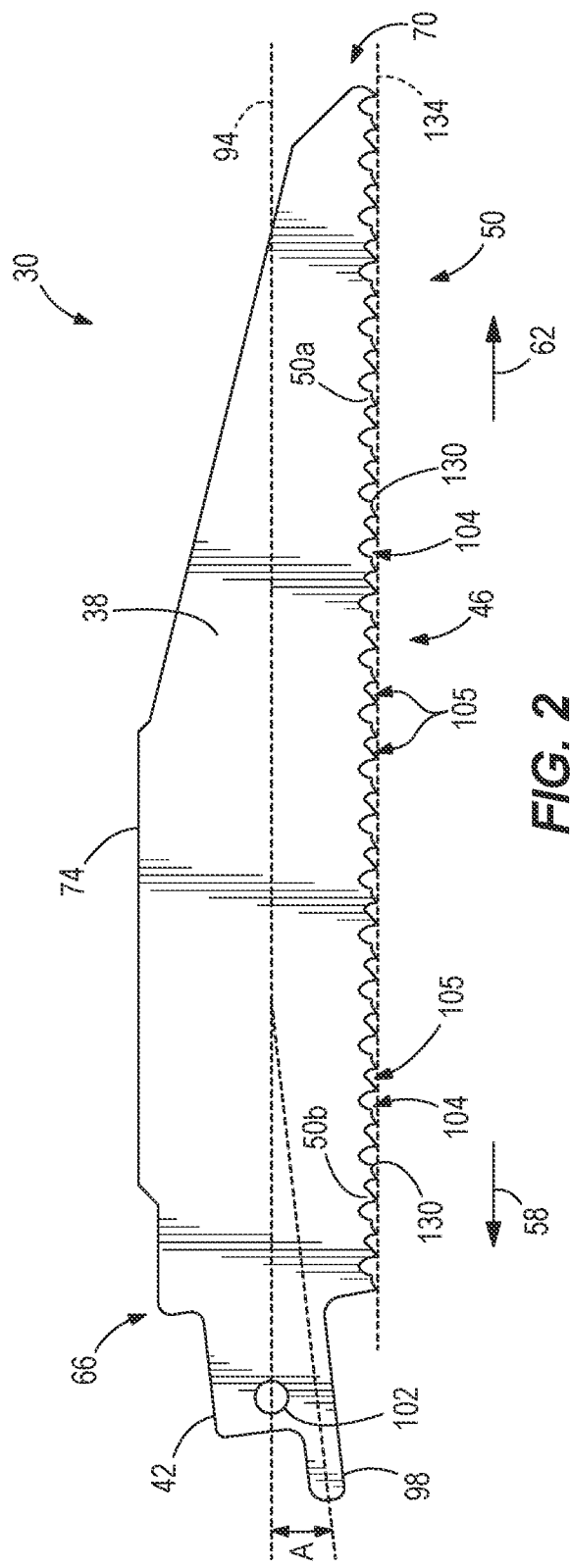
FIG. 2 is a side view of the saw blade shown in FIG. 1.
Figure 3:
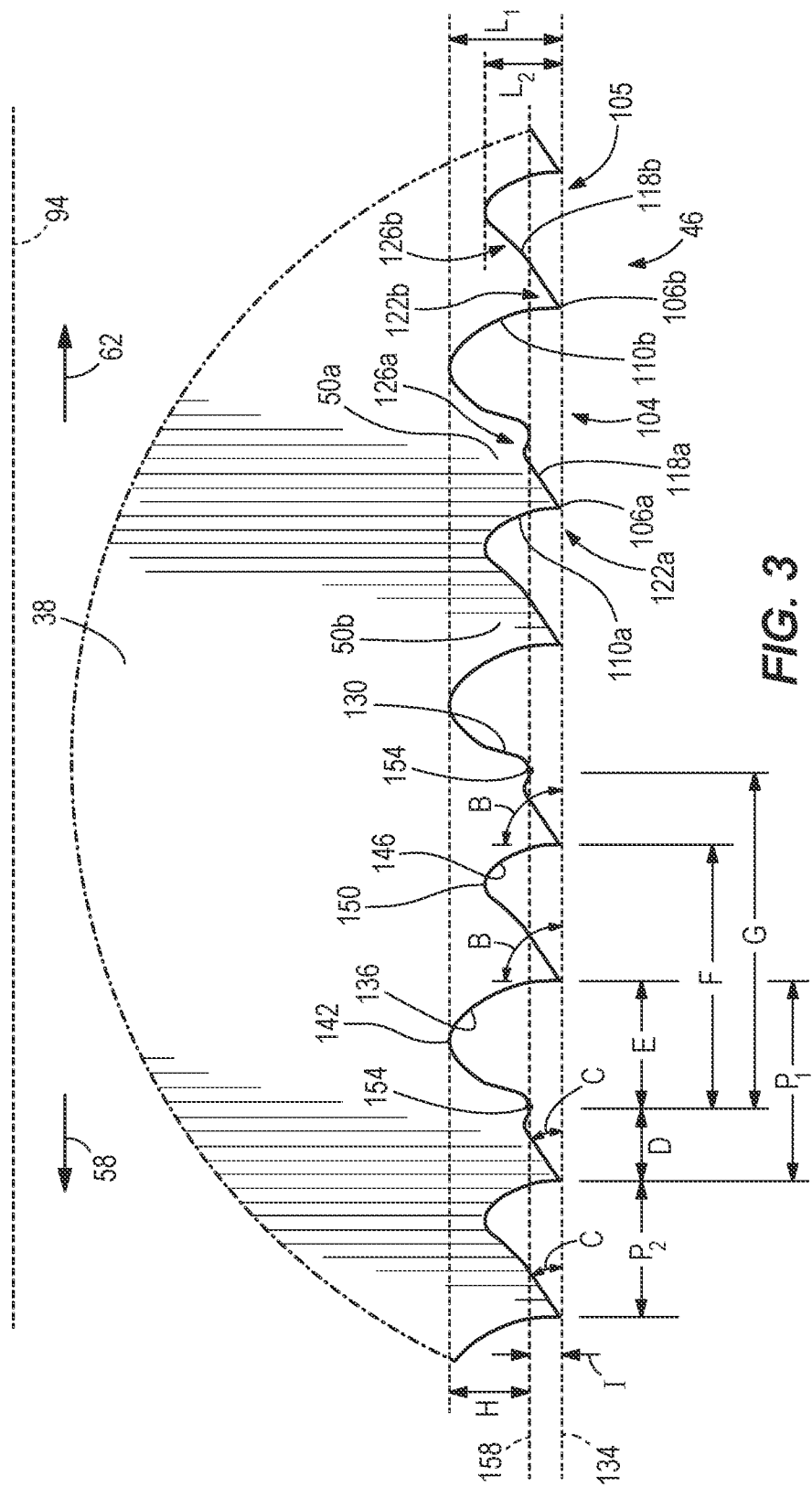
FIG. 3 is an enlarged side view of a portion of the saw blade shown in FIG. 1.
Figure 5:
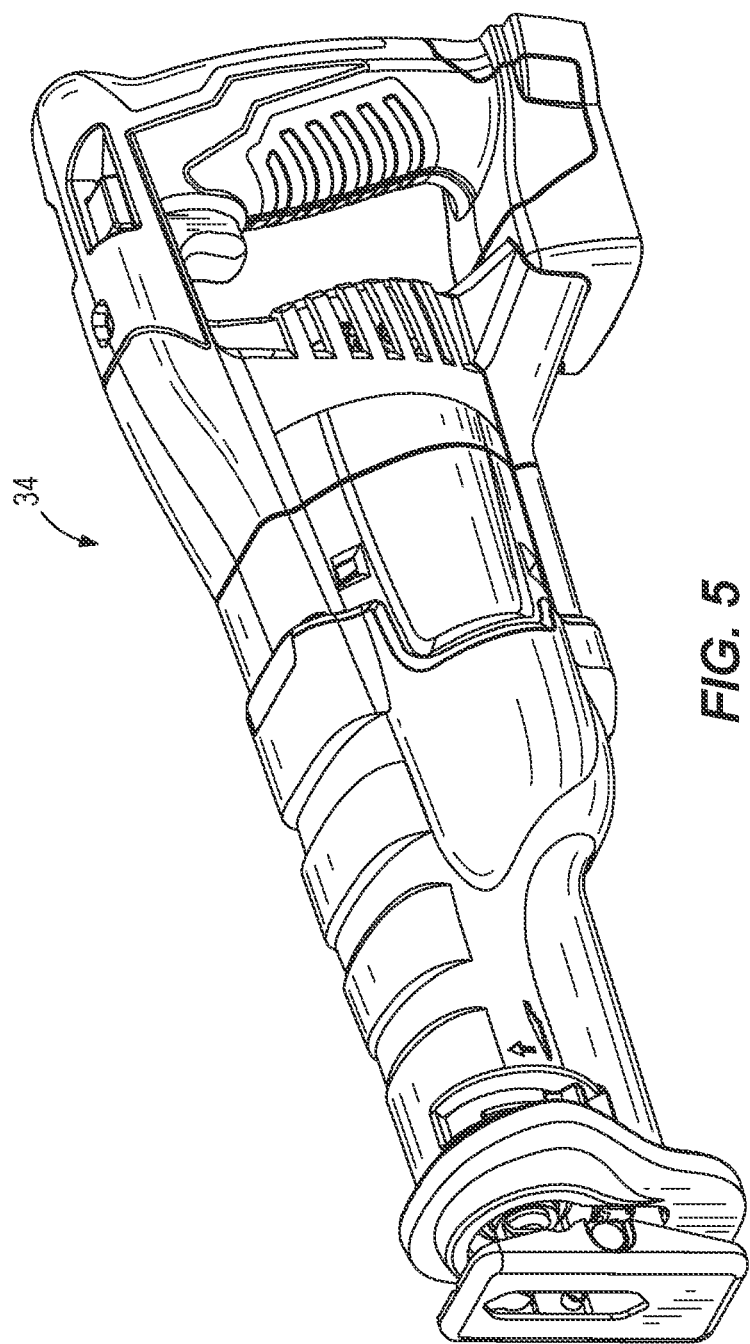
FIG. 5 is a perspective view of a reciprocating saw.

FIGS. 1-3 illustrate a saw blade 30 according to one embodiment of the invention. The illustrated saw blade 30 is a multi-material, reciprocating saw blade for use with a power tool such as, for example, a reciprocating saw 34 (FIG. 5). Many saw blades are specifically engineered for a particular material, such as clean wood, nail embedded wood, or metal. Each of these blades can have very different tooth form characteristics. For example, a multi-material blade typically used in general purpose demolition cutting needs to have exceptional durability cutting through a wide range of materials, including ferrous and non-ferrous metals, plastics, and nail-embedded wood, while balancing the tradeoffs of various tooth form characteristics relative to speed, accuracy, and quality.

The saw blade 30 includes a body 38, an attachment portion 42 for coupling the blade 30 to the reciprocating saw 34, and a cutting portion 46 having a plurality of cutting teeth 50. In the illustrated embodiment, the body 38, the attachment portion 42, and the cutting portion 46 are all integrally formed as a single piece such that the saw blade 30 is a unitary structure. In some embodiments, the saw blade 30 may be a bi-metal saw blade. In such embodiments, a majority of the body 38 may be formed of a first, softer material (e.g., spring steel, etc.), and an edge section of the body 38 where the cutting teeth 50 are formed may be formed of a second, harder material (e.g., high speed steel, carbide, etc.). The two materials may be joined (e.g., welded, brazed, etc.) together to create the saw blade 30. During operation, the saw blade 30 is reciprocated in a cutting direction 58 and a return direction 62 (FIG. 2) to cut through a work piece. In some embodiments, the saw 34 and the blade 30 may be used to cut through work pieces composed of wood having nails extending through or embedded therein as described in more detail below. In other embodiments, the work piece may be metal, plastic, etc.

The body 38 includes a first end portion 66 and a second end portion 70. The attachment portion 42 is coupled to (e.g., formed at) the first end portion 66 of the body 38 opposite the second end portion 70. A back edge 74 extends between the attachment portion 42 and the second end portion 70 on a top portion of the body 38 opposite the cutting portion 46. The body 38 also defines a longitudinal axis 94 (FIGS. 2 and 3) extending through the first end portion 66 and the second end portion 70.

The attachment portion 42 extends from the first end portion 66 of the body 38 and includes a tang 98 and an aperture 102. The tang 98 and the aperture 102 are configured to engage a blade clamp of the reciprocating saw 34 to securely and releasably couple the blade 30 to the saw 34. As shown in FIG. 2, the illustrated attachment portion 42 is angled relative to the longitudinal axis 94 by a tang angle A. In the illustrated embodiment, the tang angle A is about 6.5 degrees. In other embodiments, the tang angle A may be about 5 degrees. In further embodiments, the tang angle A may be larger or smaller than 5 degrees.

Referring to FIGS. 2 and 3, the cutting teeth 50 define a tooth form on the body 38. The cutting teeth 50 include first cutting teeth 50a and second cutting teeth 50b. The illustrated cutting teeth 50 also include a first gullet 104 and a second gullet 105 positioned between consecutive first cutting teeth 50a and second cutting teeth 50b. The illustrated tooth form includes a variable pitch (e.g., different distances between adjacent cutting teeth 50). In the illustrated embodiment, a first pitch $P_1$ that extends over one of the first gullets 104 from a first tip 106a of one cutting tooth 50a to a second tip 106b of an adjacent cutting tooth 50b is about 0.137 inches. As such, the first pitch $P_1$ equates to 7.3 teeth per inch (TPI). In other embodiments, the first pitch $P_1$ may be about 0.143 inches (e.g., about 7 TPI). In addition, a second pitch $P_2$ that extends over one of the second gullets 105 from the first tip 106a of one cutting tooth 50a to the second tip 106b of an adjacent cutting tooth 50b is about 0.093 inches (e.g., about 10.75 TPI). In other embodiments, the second pitch $P_2$ may be about 0.091 inches (e.g., about 11 TPI). In further embodiments, the first pitch $P_1$ may be greater than or less than 0.143 inches so that a TPI associated with the first pitch $P_1$ may be greater than or less than 7 TPI. In yet further embodiments, the second pitch $P_2$ may be greater than or less than 0.091 inches so that a TPI associated with the second pitch $P_2$ may be greater than or less than 11 TPI. In yet further embodiments, the first pitch $P_1$ may be between about 5 TPI and about 9 TPI, and the second pitch $P_2$ may be between about 9 TPI and about 13 TPI. In the illustrated embodiment, the cutting teeth 50 are unset such that the teeth 50 extend straight from the body 38. In other embodiments, some or all of the teeth 50 may be bent or "set" at various angles relative to a hypothetical plane defined by a side surface of the body 38. The distances and angles identified herein refer to a saw blade in which the cutting teeth are unset. However, it should be readily apparent that a saw blade may be designed according to the disclosed dimensions with unset cutting teeth, and the cutting teeth may ultimately be set as desired during manufacture.

With reference to FIG. 3, each first cutting tooth 50a includes a first rake face 110a extending from the first tip 106a toward the longitudinal axis 94, a first relief surface 118a extending from the first tip 106a and having a first end 122a that is closer to the attachment portion 42 than a second end 126a of the first relief surface 118a in a direction along the longitudinal axis 94, and a protrusion 130 extending from the second end 126a of the first relief surface 118a. Likewise, each second cutting tooth 50b includes a second rake face 110b extending from the second tip 106b toward the longitudinal axis 94, and a second relief surface 118b extending from the second tip 106b and having a first end 122b that is closer to the attachment portion 42 than a second end 126b of the second relief surface 118b in a direction along the longitudinal axis 94. However, the second cutting teeth 50b do not include the protrusions 130 so that the protrusions 130 are positioned on every other cutting tooth 50. The first and second tips 106a, 106b of the cutting teeth 50 define a plane 134 that is generally parallel to the longitudinal axis 94.

In some embodiments, the first cutting teeth 50a may include first carbide tips 106a, and the second cutting teeth 50b may include second carbide tips 106b. In such embodiments, the carbide tips 106a, 106b may be separate pieces that are welded, brazed, or otherwise secured to the bodies of the cutting teeth 50a, 50b. In other embodiments, the cutting tips 106a, 106b may be integrally formed of the same material as the rest of the cutting teeth 50a, 50b.

Each first and second rake face 110a, 110b extends from the corresponding tip 106a, 106b at a rake angle B relative to the plane 134 (FIG. 3). The rake angle B of each cutting tooth 50, measured through the corresponding cutting tooth 50, is a positive rake angle (i.e., an angle less than 90 degrees). In the illustrated embodiment, the rake angle B of each cutting tooth 50 is about 92.1 degrees. In other embodiments, the rake angle B may be larger or smaller, or each rake face 110a, 110b may extend at a negative rake angle (i.e., an angle greater than 90 degrees relative to the plane 134). In general, a saw blade including a negative rake angle B is more durable than a saw blade including a positive rake angle B, but the saw blade including the positive rake angle B will cut quicker than the saw blade including the negative rake angle B. In further embodiments, the first rake face 110a may include a different rake angle B relative to a rake angle B of the second rake face 110b. In some embodiments, one of the either the first cutting tooth 50a or the second cutting tooth 50b may have a positive rake angle, and the other of either the first cutting tooth 50a or the second cutting tooth 50b may have a negative rake angle. In such embodiments, the rake angles B of the rake faces 110a, 110b may alternate along the length of the cutting portion 46 between positive and negative.

Each of the first gullets 104 is defined by a first gullet surface 136 extending between the protrusion 130 of a first cutting tooth 50a and the second rake face 110b of an adjacent second cutting tooth 50b. The first gullet surface 136 is generally a curved surface. Each of the first gullets 104 has a first gullet depth $L_1$, or first tooth height, measured from a base 142 of the first gullet 104 to the plane 134 of the cutting teeth 50. In the illustrated embodiment, the first gullet depth $L_1$ is about 0.075 inches. In the illustrated embodiment, the first gullet depth $L_1$ is about 55% of the first pitch $P_1$. In other embodiments, the first gullet depth $L_1$ is between about 45% and about 65% of the first pitch $P_1$.

Each of the second gullets 105, which is smaller (e.g., in volume) than the first gullets 104, is defined by a second gullet surface 146 extending between the second end 126b of a second cutting tooth 50b and the first rake face 110a of an adjacent first cutting tooth 50a (FIG. 3). The second gullet surface 146 is generally a curved surface. Each of the second gullets 105 has a second gullet depth $L_2$, or second tooth height, measured from a base 150 of the second gullet 105 to the plane 134 of the cutting teeth 50. The second gullet depth $L_2$ is less than the first gullet depth $L_1$. In the illustrated embodiment, the second gullet depth $L_2$ is about 0.051 inches. The illustrated second gullet depth $L_2$ is about 55% of the second pitch $P_2$. In other embodiments, the second gullet depth $L_2$ is between about 45% and about 65% of the second pitch $P_2$.

The first and second relief surface 118a, 118b of each cutting tooth 50 extends generally toward the longitudinal axis 94 and toward the second end portion 70. The first and second relief surfaces 118a, 118b are oriented at relief angles C relative to the plane 134 (FIG. 3). In the illustrated embodiment, the relief angle C of each cutting tooth 50 is about 34 degrees. In other embodiments, the relief angles C may be larger or smaller. In further embodiments, the first relief surface 118a may include a different relief angle C relative to the relief angle C of the second relief surface 118b. The first relief surface 118a also includes a first relief length measured from the first end 122a (e.g., the first tip 106a) to the second end 126a (e.g., a beginning of the protrusion 130), and the second relief surface 118b includes a second relief length measured from the first end 122b (e.g., the second tip 106b) to the second end 126b (e.g., a beginning of the second gullet 105). In one embodiment, the first relief length of the first relief surface 118a is the same as the second relief length of the second relief surface 118b. In other embodiments, the first relief length may be different than the second relief length.

With continued reference to FIG. 3, the first relief surface 118a of each first cutting tooth 50a is interrupted by the protrusion 130 extending from the second end 126a of the first relief surface 118a. In the illustrated embodiment, an apex 154 of each protrusion 130 is curved such that the protrusions 130 are generally rounded. In other embodiments, the protrusions 130 may have other shapes or forms. The apex 154 of the illustrated protrusion 130 of each first cutting tooth 50a is spaced a first distance D, measured generally parallel to the longitudinal axis 94, from the first tip 106a of the corresponding first cutting tooth 50a. The apex 154 of the illustrated protrusion 130 is spaced a second distance E, measured generally parallel to the longitudinal axis 94, from the second tip 106b of an adjacent second cutting tooth 50b. The second distance E also represents a width of the first gullet 104. The apex 154 of the illustrated protrusion 130 is spaced a third distance F, measured generally parallel to the longitudinal axis 94, from the first tip 106a of an adjacent first cutting tooth 50a. The apex 154 of the illustrated protrusion 130 is spaced a fourth distance G, measured generally parallel to the longitudinal axis 94, from an apex 154 of an adjacent protrusion 130. In the illustrated embodiment, the first distance D is about 0.049 inches, the second distance E is about 0.087 inches, the third distance F is about 0.180 inches, and the fourth distance G is about 0.229 inches. In other embodiments, the first distance D may be between about 0.03 inches and about 0.07 inches, the second distance E may be between about 0.07 inches and about 1.1 inches, the third distance F may be between about 0.16 inches and about 0.2 inches, and the fourth distance G may be between about 0.21 inches and about 0.25 inches.

The apexes 154 of the protrusions 130 of the first cutting teeth 50a also define a plane 158 that is generally parallel to the longitudinal axis 94 and to the plane 134 defined by the first and second tips 106a, 106b of the cutting teeth 50. In the illustrated embodiment, the plane 158 is spaced a fifth distance H, measured generally perpendicular to the longitudinal axis 94, from the base 142 of the first gullet 104. In the illustrated embodiment, the fifth distance H is about 0.0543 inches. In other embodiments, the fifth distance H may be between about 0.05 inches and about 0.07 inches. In some embodiments, a ratio of the fifth distance H over the first distance $L_1$ is about 0.724 to 1. In other embodiments, the ratio of the fifth distance H over the first distance $L_1$ is between about 0.6 and about 0.8. In some embodiments, a sixth distance I between the plane 134 defined by the first and second tips 106a, 106b and the plane 158 defined by the protrusions 130 is at most 0.021 inches. In the illustrated embodiment, the sixth distance I is about 0.021 inches. Such an arrangement helps inhibit nails from entering the first and second gullets 104, 105 of the cutting teeth 50 during cutting operations, as further discussed below.

Figure 4:
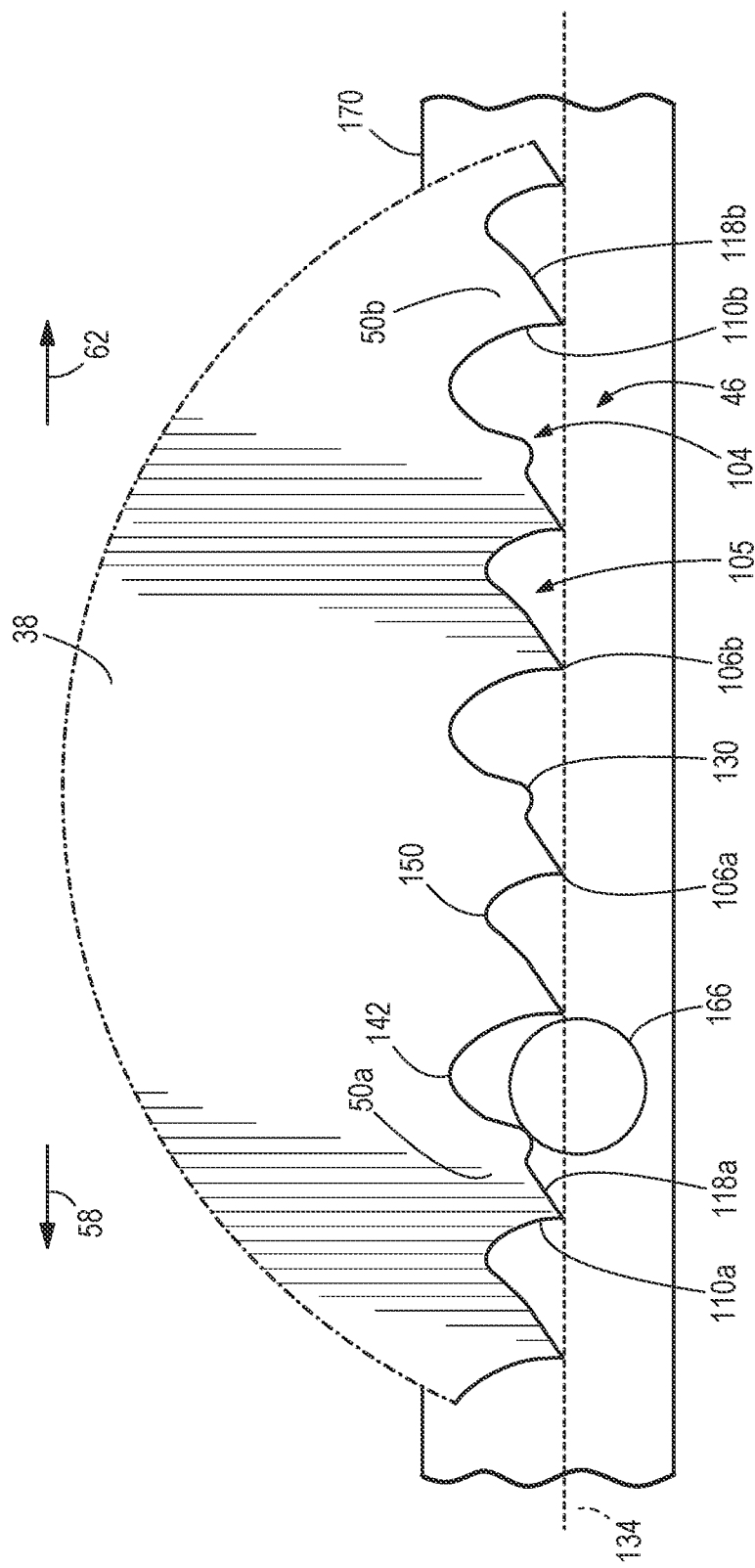
FIG. 4 is an enlarged side view of the portion of the saw blade shown in FIG. 3, the saw blade cutting through a work piece having nails extending therethrough.

Referring to FIG. 4, the protrusions 130 of the first cutting teeth 50a inhibit nails 166, or other hard objects, imbedded in a work piece 170 from entering the first gullets 104 and contacting the second rake faces 110b of the second cutting teeth 50b during cutting operations. As the saw blade 30 moves in the cutting direction 58 (to the left in FIG. 4), the first and second tips 106a, 106b of the cutting teeth 50 engage and cut through the work piece 170. The protrusions 130 are hidden behind the first tips 106a of adjacent first cutting teeth 50a such that the protrusions 130 do not cut the work piece 170 during the cutting operation.

When a typical saw blade encounters the nail 166, the nail 166 would move into a gullet so that an adjacent cutting tooth (i.e., the rake face) may shear all or most of the nail 166 for the adjacent cutting tooth to move past the nail 166 in the cutting direction 58. Such contact may chip, break, or otherwise damage the cutting tooth, significantly reducing the usable life of the saw blade. However, as shown in FIG. 4, the protrusions 130 limit an amount of the nail 166 impacting the second rake faces 110b. As the saw blade 30 moves in the cutting direction 58, the nail 166 contacts one of the protrusions 130 before contacting the adjacent second cutting tooth 50b. The protrusion 130 displaces (e.g., lifts) the saw blade 30, which repositions the nail 166 with respect to the first gullet 104 in an improved cutting position. In the improved cutting position, the protrusion 130 inhibits a majority of the nail 166 from entering the first gullet 104 and the second tip 106b is allowed to cut into a smaller portion of the nail 166. In other words, minimal impact occurs between the nail 166 and the second rake face 110b. Furthermore, the protrusions 130 also allow for the nail 166 to skip over the second gullets 105 to inhibit the nail 166 from entering the second gullets 105. For example, the second gullets 105 are able to move past the nail 166 after the protrusions 130 displace the saw blade 30 away from the nail 166. In other words, the nail 166 skips from one protrusion 130 over the second gullet 105 to an adjacent protrusion 130. As such, in some embodiments, the nail 166 does not impact the first rake face 110a of the first cutting tooth 50a. When the saw blade 30 is reciprocated in the return direction 62 (to the right in FIG. 4), the nail 166 can ride along the corresponding relief surface 118a, 118b and over the tips 106a, 106b.

In the illustrated embodiment, the protrusions 130 of the first cutting teeth 50a and the second gullets 105 are designed to inhibit a standard framing nail having a 0.131 inch diameter from entering the first and second gullets 104, 105. In other embodiments, the protrusions 130 may be optimized to inhibit other size nails from entering the first and second gullets 104, 105. The protrusions 130 are sized and positioned to inhibit more than about 21% of the nail 166 from entering the area between the plane 134 of the first tip 106a and the base 142 of the first gullet 104. Such a configuration results in an increase in durability compared to a similar saw blade without protrusions on the cutting teeth. As used herein, the term 'durability' refers to the average number of cuts a saw blade makes before fracturing a cutting tooth. In some embodiments, the term 'durability' may refer to the average number of fractured teeth in a cut zone of the saw blade after one cut of the saw blade.

Because the saw blade 30 includes a high TPI (e.g., equal to or greater than 7 TPI), about half of the cutting teeth 50 include the protrusions 130 to balance the durability of the saw blade 30 with the cutting efficiency of the saw blade 30. The cutting efficiency of the saw blade 30 (e.g., the rate of which the saw blade 30 cuts through the work piece 170) is dependent upon gullet volume of the first and second gullets 104, 105 to extract cut material (e.g., chips) away from the work piece 170. For example, if the saw blade 30 includes more protrusions 130, the durability of the saw blade 30 increases, but the total gullet volume of the saw blade 30 will decrease, causing a decrease in efficiency of cutting the work piece 170 (e.g., a slower cut of the work piece 170). However, if the saw blade 30 includes fewer protrusions 130, the durability of the saw blade 30 decreases, but the total gullet volume of the saw blade 30 will increase, causing an increase in efficiency of cutting the work piece 170 (e.g., a faster cut of the work piece 170).

Although particular embodiments embodying independent aspects of the present invention have been shown and described, other alternative embodiments will become apparent to those skilled in the art and are within the intended scope of the independent aspects of the invention. For example, although the above saw blade tooth forms have been described with reference to saw blades for use with reciprocating saws that alternately move the saw blades in cutting directions and return directions, the tooth forms may be used on other types of saw blades having a linear edge, including band saw blades and jig saw blades.

Various features and advantages of the disclosure are set forth in the following claims.

What is claimed is:

1. A saw blade for use with a power tool, the saw blade comprising:
   a body defining a longitudinal axis; and
   a cutting portion formed on the body, the cutting portion including consecutive first and second cutting teeth, the first and second cutting teeth each including a rake surface, a relief surface, and a tip positioned between the rake and relief surfaces, the first cutting tooth including a protrusion extending from an end of the relief surface of the first cutting tooth opposite the tip, the second cutting tooth does not include a protrusion on the relief surface of the second cutting tooth, the cutting portion including a gullet positioned between the first cutting tooth and the second cutting tooth,
   wherein the protrusion of the first cutting tooth is configured to inhibit a nail from entering the first gullet and contacting the rake surface of the second cutting tooth during a cutting operation;
   wherein a first distance, measured perpendicular to the longitudinal axis, from the end of the relief surface of the first cutting tooth to the body is smaller than a second distance, measured perpendicular to the longitudinal axis, from an apex of the protrusion of the first cutting tooth to the body;
   wherein the protrusion of the first cutting tooth includes an apex defining an apex plane parallel to the longitudinal axis; and
   wherein the tip of the first cutting tooth and the end of the relief surface of the first cutting tooth are positioned on opposite sides of the apex plane.

2. The saw blade of claim 1, wherein the cutting portion further includes a third cutting tooth and a second gullet positioned between the second cutting tooth and the third cutting tooth, wherein the second gullet is smaller than the first gullet.

3. The saw blade of claim 1, wherein the cutting portion further includes:
   a third cutting tooth having a rake surface, a relief surface, and a tip positioned between the rake and relief surfaces;
   a second gullet positioned between the second cutting tooth and the third cutting tooth;
   a first pitch extending over the first gullet from the tip of the first cutting tooth to the tip of the second cutting tooth; and
   a second pitch extending over the second gullet from the tip of the second cutting tooth to the tip of the third cutting tooth, wherein the second pitch is less than the first pitch.

4. The saw blade of claim 3, wherein an apex of the protrusion of the first cutting tooth is spaced a first distance, measured parallel to the longitudinal axis, from the tip of the first cutting tooth, wherein the apex of the protrusion of the first cutting tooth is spaced a second distance, measured parallel to the longitudinal axis, from the tip of the second cutting tooth, wherein the first distance is not equal to the second distance, wherein a ratio of the second pitch to the first distance is between about 1.3 and 3.1, and wherein a ratio of the second pitch to the second distance is between about 0.8 and 1.3.

5. The saw blade of claim 1, wherein the cutting portion further includes a third cutting tooth immediately adjacent the second cutting tooth, the third cutting tooth having a rake surface, a relief surface, a tip positioned between the rake and relief surfaces, and a protrusion extending from an end of the relief surface of the third cutting tooth.

6. The saw blade of claim 1, further comprising an attachment portion coupled to an end of the body and configured to couple to the power tool.

7. The saw blade of claim 1, wherein the rake faces of the first and second cutting teeth extend from the corresponding tips at a positive rake angle.

8. The saw blade of claim 1, wherein the rake faces of the first and second cutting teeth extend from the corresponding tips at a negative rake angle.

9. The saw blade of claim 1, wherein the rake face of one of the first and second cutting teeth extends from the corresponding tip at a negative rake angle, and the rake face of the other of the first and second cutting teeth extends from the corresponding tip at a positive rake angle.

10. A saw blade for use with a power tool, the saw blade comprising:
   a body defining a longitudinal axis; and
   a cutting portion formed on the body, the cutting portion including consecutive first, second, and third cutting teeth, the first, second, and third cutting teeth each including a rake surface, a relief surface, and a tip positioned between the rake and relief surfaces, the first cutting tooth including a protrusion extending from an end of the relief surface of the first cutting tooth, the second cutting tooth not including a protrusion on the relief surface of the second cutting tooth, the third cutting tooth including a protrusion extending from an end of the relief surface of the third cutting tooth, the cutting portion including a first gullet positioned between the first cutting tooth and the second cutting tooth,
   wherein the protrusion of the first cutting tooth is configured to inhibit a nail from entering the first gullet and contacting the rake surface of the second cutting tooth during a cutting operation,
   wherein the tips of the first and second cutting teeth define a plane, and wherein an apex of the protrusion of the first tooth is spaced apart from the plane and positioned between the plane and the body.

11. The saw blade of claim 10, wherein the protrusions of the first and third cutting teeth define a plane, and the tip of the first cutting tooth and a portion of the relief surface of the first cutting tooth are positioned on opposite sides of the plane.

12. The saw blade of claim 10, wherein the cutting portion further includes:
   a second gullet positioned between the second cutting tooth and the third cutting tooth;
   a first pitch extending over the first gullet from the tip of the first cutting tooth to the tip of the second cutting tooth; and
   a second pitch extending over the second gullet from the tip of the second cutting tooth to the tip of the third cutting tooth, wherein the second pitch is less than the first pitch.

13. The saw blade of claim 12, wherein the first pitch equates to a pitch between 5 teeth per inch and 9 teeth per inch, and wherein the second pitch equates to a pitch between 9 teeth per inch and 13 teeth per inch.

14. The saw blade of claim 12, wherein the tips of the first, second, and third cutting teeth define a tip plane, and wherein the first gullet includes a first gullet depth measured from a base of the first gullet to the tip plane perpendicular to the tip plane, and wherein the second gullet includes a second gullet depth measured from a base of the second gullet to the tip plane perpendicular to the tip plane, and wherein the first gullet depth is greater than the second gullet depth.

15. The saw blade of claim 14, wherein the first gullet depth is between 45% and 65% of the first pitch, and wherein the second gullet depth is between 45% and 65% of the second pitch.

16. The saw blade of claim 14, wherein the protrusions of the first and third cutting teeth include apexes defining a protrusion plane, and wherein the protrusion plane is spaced a distance, measured perpendicular to the tip plane, from the base of the first gullet, and wherein a ratio of the distance over the first gullet depth is between 0.6 and 0.8.

17. The saw blade of claim 10, wherein the third cutting tooth is formed on the body to include the same shape as the first cutting tooth.

18. A saw blade for use with a power tool, the saw blade comprising:
   a body defining a longitudinal axis; and
   a cutting portion formed on the body, the cutting portion including consecutive first, second, and third cutting teeth, the first, second, and third cutting teeth each including a rake surface, a relief surface, and a tip positioned between the rake and relief surfaces, the first cutting tooth including a protrusion extending from an end of the relief surface of the first cutting tooth opposite the tip, the protrusion having a rounded apex, the second cutting tooth not including a protrusion on the relief surface of the second cutting tooth, the cutting portion including a first gullet positioned between the first cutting tooth and the second cutting tooth, and a second gullet sized differently than the first gullet positioned between the second cutting tooth and third cutting tooth,
   wherein the protrusion of the first cutting tooth is configured to inhibit a nail from entering the first gullet and contacting the rake surface of the second cutting tooth during a cutting operation; and
   wherein a first distance, measured perpendicular to the longitudinal axis, from the end of the relief surface of the first cutting tooth to the body is smaller than a second distance, measured perpendicular to the longitudinal axis, from an apex of the protrusion of the first cutting tooth to the body, and wherein a third distance, measured perpendicular to the longitudinal axis, from the tip of the first cutting tooth to the body is larger than the second distance.

19. The saw blade of claim 18, wherein the third cutting tooth includes a protrusion extending from an end of the relief surface of the third cutting tooth.

20. The saw blade of claim 10, wherein the apex of the protrusion of the first cutting tooth is spaced a first distance, measured parallel to the longitudinal axis, from the tip of the first cutting toothing, wherein the apex of the protrusion of the first cutting tooth is spaced a second distance, measured parallel to the longitudinal axis, from the tip of the second cutting toothing, and wherein the first distance is not equal to the second distance.

* * * * *